L. H. PIKE.
SUSPENSION CLAMP FOR TROLLEY WIRES.
APPLICATION FILED MAY 25, 1917.

1,322,945.

Patented Nov. 25, 1919.

Inventor.
Lorenzo H. Pike,
By Chas. N. Butler
Attorney.

UNITED STATES PATENT OFFICE.

LORENZO H. PIKE, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA.

SUSPENSION-CLAMP FOR TROLLEY-WIRES.

1,322,945. Specification of Letters Patent. Patented Nov. 25, 1919.

Application filed May 25, 1917. Serial No. 170,798.

*To all whom it may concern:*

Be it known that I, LORENZO H. PIKE, a citizen of the United States, residing in the city of Philadelphia, county of Philadelphia, and State of Pennsylvania, have invented certain Improvements in Suspension-Clamps for Trolley-Wires, of which the following is a specification.

My invention is a suspension clamp for trolley wires, which is specially applicable for use in mines but is adapted for general use, and its primary object is to provide a device that can be applied conveniently to make a firm connection with the insulator as well as the wire, effecting a secure and rigid connection between the insulator and the wire.

Suspension clamps heretofore used have been open to various objections, a characteristic defect being a lack of capacity for connecting them rigidly to the insulators after fixing them to the wire, with resulting objectionable movements, wear and breakage, which are avoided by my improvements.

Figure 1:
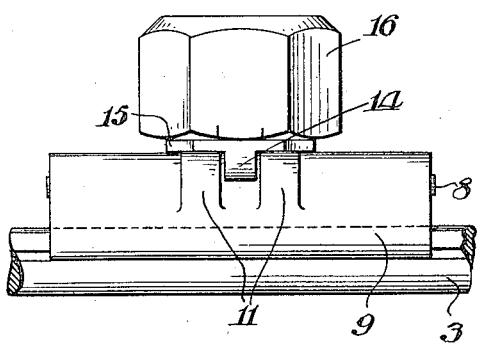
Figure 2:
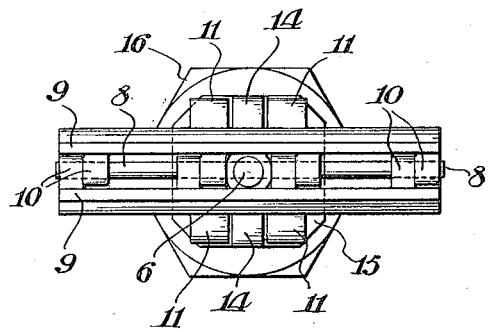
Figures 3, 4:
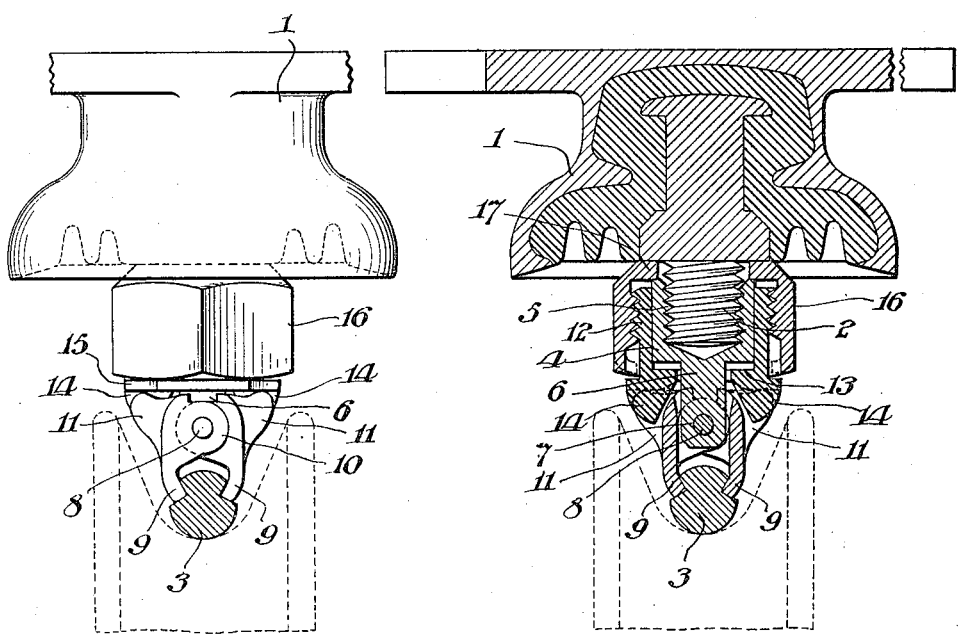

In the drawings, Figure 1 is a side elevation of a suspension clamp embodying my improvements; Fig. 2 is a bottom view of the same with the jaws open; Fig. 3 is an end elevation of the device in operative position; and Fig. 4 is a vertical sectional view taken transversely through the center of the device in operative position.

The drawing illustrates a conventional insulator 1 provided with the threaded stud 2 for suspending the trolley wire 3 through a device adapted to be screwed on the stud and clamped on the wire.

This device, according to the form of my improvements illustrated, comprises a coupling having a cylindrical body 4 containing the threaded socket 5 adapted to be screwed on the stud 2, and the stem 6 containing a hole 7 for the passage of a pintle 8. Jaws 9 are provided with the respective hinges 10 through which the pintle 8 passes to connect them together so that each is adapted to oscillate, each jaw being provided with a pair of lugs 11.

An externally threaded sleeve 12 fits on the body 4 and has a collar or internal flange 13 surrounding the stem 6, the lugs 14 respectively disposed between lugs 11, and a base plate or bearing 15 adapted to bear on the lugs 11. A nut 16 is screwed on the sleeve and is provided at its top with an internal flange 17 forming a broad top bearing adapted for engaging the insulator 1.

The device is applied by screwing the coupling body 4 on the stud 2, with the nut 16 screwed down on the sleeve 12, as far as is possible consistent with positioning the jaws 9 for engagement with the wire 3. The coupling being engaged on the stud and the jaws on the wire, the nut 16 is screwed up on the sleeve 12 until the top bearing 17 engages the insulator, when the nut is turned further to force the sleeve down on the body and the bearing 15 against the lugs 11, thereby firmly clamping the jaws on the wire and tightening the connections of all the parts.

It will be understood that whereas suspension clamps heretofore used cannot be screwed up into the desired tight relation to the insulator while obtaining the correct positions for the jaws for engaging the wire to be suspended, and therefore the specified defects attend their use, the devices embodying my invention overcome such defects by simple and efficient means.

Having described my invention, I claim:

1. In mechanism of the character described, a pair of jaws, a coupling with which said jaws are pivotally connected, a device movable relatively to said coupling for clamping said jaws, and means comprising a device movable relatively to said device first named to operate the latter and effect the clamping of said jaws.

2. In mechanism of the character described, a coupling provided with a threaded socket, a pair of jaws connected with said coupling, a sleeve movable on said coupling for clamping said jaws, and a nut having a threaded engagement with said sleeve for effecting said clamping operation.

3. In mechanism of the character described, a pair of jaws, a coupling provided with a body containing a threaded socket and having a stem relative to which said jaws are hinged, a threaded sleeve movable on said body and having an internal flange movable on said stem, and means comprising a threaded stud engaged in said socket and a nut engaged on said sleeve for operating the latter to clamp said jaws.

4. In mechanism of the character described, the combination with an insulator having a threaded stud, of a member having a threaded socket adapted for receiving said stud, said member having a stem, a pintle supported by said stem, jaws having hinges connected by said pintle, said jaws having lugs thereon, a threaded sleeve movable on said member, said sleeve having lugs adapted to be engaged by said lugs first named to prevent their revolution, and a nut engaged on said sleeve and adapted for engaging said insulator for operating said sleeve and clamping said jaws thereby.

5. In mechanism of the character described, the combination with an insulator having a threaded stud, of a member having a threaded socket adapted for receiving said stud, jaws connected with said member, non-revoluble means telescoped on and movable under control of said member for clamping said jaws, and a nut having a turning engagement with said insulator and a threaded engagement with said means for operating the latter and clamping said jaws.

In testimony whereof I have hereunto set my name this 22nd day of May, 1917.

LORENZO H. PIKE.